United States Patent Office 2,797,977
Patented July 2, 1957

2,797,977

LEACHING URANIUM FROM SULPHIDIC MATERIALS

Frank A. Forward and Jack Halpern, Vancouver, British Columbia, Canada, assignors to Canadian Patents and Development Limited, Ottawa, Canada No Drawing. Application October 13, 1954, Serial No. 462,116

9 Claims. (Cl. 23—14.5)

This invention relates to a method of extracting uranium values from uranium bearing material such as ores, concentrates, metallurgical residues, intermediates, by-products and the like.

Uranium usually is found in nature as an oxide such as pitchblende, $U_3O_8$, or as a phosphate such as torbernite, metatorbernite and autunite or associated with values of other metals such as with vanadium as carnotite, a uranium vanadate. Uranium may be and frequently is associated in ore deposits and in uranium bearing by-products, metallurgical intermediates and residues with values of other minerals from which the uranium must be separated to produce a uranium product suitable for laboratory and commercial use.

Hydrometallurgical methods involving the employment of alkaline or acid leach solutions for extracting uranium values from uranium bearing ores and concentrates are known and are in commercial use. Known hydrometallurgical methods have the disadvantage that they cannot be employed economically for the extraction of uranium values from uranium bearing starting material which contains sulphur or sulphides in that the consumption of leaching reagents through reaction with the sulphides is excessive. Also, the presence of metal sulphides, such as iron sulphide, may present an important economic problem in that dissolution in the leach solution of metal values other than uranium values results in excessive consumption of precipitation reagents and makes it difficult to recover a high grade uranium product from the leach solution. Also, it has been found that with some uranium bearing material which contains mineral sulphides, the recovery of uranium values by known hydrometallurgical methods is too low for economic recovery.

We have found that the presence of mineral sulphides in uranium bearing material can be employed with advantage to provide a novel method of extracting uranium values from uranium bearing material at an extraction efficiency and at an operating cost heretofore considered to be impossible to realize.

We have found further that surphur when associated with the uranium bearing starting material as a mineral sulphide or as elemental sulphur reacts with water in the presence of an oxygen bearing, oxidizing gas such as oxygen, oxygen enriched air or air alone without oxygen enrichment, to generate sulphuric acid. Under the conditions of treatment described in detail hereinafter, uranium values are rapidly dissolved in the leach solution with a high degree of extractive efficiency.

In its simplest form, the only reagents required in the operation of the present invention are the uranium bearing starting material, mineral sulphides or elemental sulphur, water and air.

A primary reaction in the method of the present invention is that elemental sulphur and mineral sulphides in suspension in water or in aqueous acid sulphate solution are oxidized to sulphates when heated to moderately elevated temperature and maintained under a positive partial pressure of gaseous molecular oxygen, such as results from feeding air or oxygen enriched air, or oxygen into the reaction vessel. This oxidation process generates sulphuric acid and the solution thus can be rendered sufficiently acidic to react with the uranium mineral and dissolve the uranium values. The combination of elevated temperature and partial pressure of oxygen further ensures that this reaction is rapid and that substantially all the uranium values are dissolved in the solution in a relatively short period of time.

In operating the method, a pulp or slurry comprised of finely divided uranium bearing starting material, elemental sulphur or a mineral sulphide which may be associated with or added to the uranium bearing starting material, and water or re-cycled sulphate-sulphuric acid solution in desired proportions is heated in a closed reaction vessel under a partial pressure of gaseous molecular oxygen, or a gas containing molecular oxygen such as air, to a temperature above about 80° C. The pulp mixture is agitated sufficiently to maintain a substantially uniform dispersion of solids in the solution and is maintained under these temperature and pressure conditions until the uranium values are dissolved by the solution, after which the solution containing dissolved uranium values is separated from the undissolved residue such as by filtration. Uranium values can be precipitated from the solution by any one or combination of known methods, such as by neutralization with ammonia or caustic soda or caustic potash and separated from the solution by filtration.

The method is, of course, independent of hypothetical considerations and is based on results obtained from operation of the method under varying conditions. However, the following equations illustrate the overall chemical reactions which occur during the leaching treatment when elemental sulphur or a sulphidic mineral is present in the reaction mixture:

$$S + 1\tfrac{1}{2}O_2 + H_2O \rightarrow H_2SO_4 \qquad 1$$

If a metal sulphide, such as pyrite, $FeS_2$, is present, it converts to ferrous sulphate or ferric sulphate or may be precipitated as basic ferric sulphate according to the following reaction:

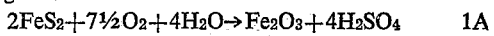

$$2FeS_2 + 7\tfrac{1}{2}O_2 + 4H_2O \rightarrow Fe_2O_3 + 4H_2SO_4 \qquad 1A$$

Under the conditions of treatment, oxidized uranium minerals react with the acid solution thus generated and dissolve readily. When uranium is present in the form of pitchblende, $U_3O_8$, the leaching reaction is represented by the following equation:

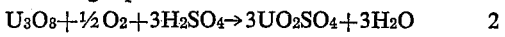

$$U_3O_8 + \tfrac{1}{2}O_2 + 3H_2SO_4 \rightarrow 3UO_2SO_4 + 3H_2O \qquad 2$$

Other uranium minerals such as torbernite, metatorbernite, carnotite, autunite, and the like, have been found to react and dissolve in the solution.

Factors which influence the rate at which uranium values are extracted from the uranium bearing starting material and dissolved in the leach solution, and the extractive efficiency of the method are temperature, partial pressure of oxygen, agitation, pulp density, the presence and amount of sulphur present in the reaction vessel, and the hydrogen ion concentration or pH value of the solution.

The reaction can be conducted at a relatively low temperature of the order of about 80° C. or lower. At temperatures below about 80° C., however, the reaction proceeds slowly and the rate of oxidation of sulphides and dissolution of uranium values increases as the temperature is increased. As the temperature of the reaction is increased, progressively increasing amounts of impurities such as iron, aluminum, and magnesium, if present in the starting material, tend to oxidize to and dissolve in the leach solution as sulphate salts. We have found that if the reaction is conducted at a temperature within the range of from about 100° C. to about 150° C. it proceeds rapidly and dissolution of values of metals other than uranium is maintained at a minimum. Also, the acid concentration of the solution remains fairly low within that temperature range and iron dissolved in the solution tends to hydrolyze and re-precipitate as ferric oxide and basic ferric sulphate. As the temperature is increased, progressively more acid is generated and the solubility of iron, aluminum and magnesium tends to increase. Also, as the reaction temperature is increased the leach solution becomes progressively more corrosive and costly, corrosion resistant equipment is required. At temperatures below about 100° C. the oxidation of sulphides and the formation of acids and extraction of uranium values are slow. Thus, it is preferred to conduct the leaching reaction at a temperature within the range of from about 100° C. to about 150° C. although temperatures as low as about 80° C. and as high as 200° C. can be employed if desired.

The oxidation reaction will proceed as long as oxygen is present in the solution. As the reaction preferably is conducted at temperatures at or above the boiling point of the solution where the vapour pressure of the solution is high and the solubility of oxygen in the solution is low, it is necessary to operate at superatmospheric pressure in a closed reaction vessel so that a partial pressure of molecular oxygen can be maintained above the solution. A partial pressure of oxygen as low as from 2 to 3 pounds per square inch can be employed but the reaction rate is low and it is preferable to maintain the oxygen partial pressure at from about 5 to 10 pounds per square inch or higher in order to complete the reaction within a reasonable time. A gas such as air, oxygen enriched air, or oxygen alone which contains molecular oxygen, can be used, gaseous diluents such as nitrogen having no effect on the reaction providing that the total pressure is increased to allow for their partial pressure.

The slurry should be agitated sufficiently to maintain a relatively uniform dispersion of solids in the leach solution. The slurry can be agitated by any conventional method, such as by a mechanical agitator.

The ratio of solids to solution in the reaction zone, or the pulp density, influences the rate of oxidation of sulphides and dissolution of uranium values in the solution. The velocity of the reaction is not appreciably affected by a change in pulp density, the maximum density being that at which the solids can be maintained as a relatively uniform dispersion in the aqueous solution. The minimum density is governed by operating economics to obtain the maximum dissolution of uranium values within a reasonable time. Pulp mixtures of the order of from about 25% to about 60% solids are very satisfactory having regard to the overall economics of the method.

The sulphur required for the generation of sulphuric acid can be in the form of mineral sulphides associated naturally with the uranium values in the starting material or natural or artificial mineral sulphides added to the starting material, or it can be in the form of finely divided particles of elemental sulphur. Sulphidic minerals such as pyrrhotite, $Fe_7S_8$, pyrite, $FeS_2$, and other naturally occurring or artificially produced sulphidic minerals can be employed with advantage. In general, sulphidic or elemental sulphur should be present in the starting material in amount sufficient to produce during the reaction an aqueous acid sulphate solution having a pH value of the order of from about pH 1 to about pH 3. Progressively increasing amounts of values of iron and other metals, if associated with the starting material, are dissolved in the solution as the acid concentration is increased. Thus, it is preferred to provide sufficient mineral sulphides or elemental sulphur in the slurry to produce a pH value of the order of from about pH 1 to about pH 3.

Typical results obtained in the operation of the present invention are set out in Tables I, II, III which follow. Uranium ores employed contained mineral sulphides in the form of pyrite, $FeS_2$, and it was not necessary to supply additional sulphur.

TABLE I

| Ore | A | A¹ | B | B¹ | C | D | E | F | G | H | I |
|---|---|---|---|---|---|---|---|---|---|---|---|
| Analysis: | | | | | | | | | | | |
| $U_3O_8$—by wt | 0.11 | 0.11 | 0.09 | 0.09 | 0.63 | 0.63 | 0.16 | 0.16 | 0.16 | 0.16 | 0.16 |
| S—by wt | 13.4 | 13.4 | 11.6 | 11.6 | 3.3 | 3.3 | 4.5 | 4.5 | 4.5 | 4.5 | 4.5 |
| Fe—by wt | 12.1 | 12.1 | 12.6 | 12.6 | 8.3 | 8.3 | 3.8 | 3.8 | 3.8 | 3.8 | 3.8 |
| $SiO_2$—by wt | n. d. | n. d. | 34.4 | 34.4 | 78.1 | 78.1 | 89.6 | 89.6 | 89.6 | 89.6 | 89.6 |
| $Al_2O_3$—by wt | n. d. | n. d. | 8.6 | 8.6 | n. d. | n. d. | 2.9 | 2.9 | 2.9 | 2.9 | 2.9 |
| Mg—by wt | n. d. | n. d. | 2.8 | 2.8 | n. d. | n. d. | trace | trace | trace | trace | trace |

TABLE II

| Leaching conditions: | | | | | | | | | | | |
|---|---|---|---|---|---|---|---|---|---|---|---|
| Grind—percent 0.0029″ | 85 | 85 | 93 | 93 | 99 | 75 | 75 | 75 | 75 | 75 | 75 |
| Pulp Density— | | | | | | | | | | | |
| Percent Solids | 25 | 25 | 33.3 | 33.3 | 25 | 25 | 50 | 50 | 50 | 50 | 50 |
| Temp., °C | 125 | 125 | 125 | 125 | 100 | 150 | 150 | 150 | 120 | 100 | 120 |
| $O_2$ pp—p. s. i | 30 | 30 | 30 | 30 | 30 | 30 | 50 | 50 | 50 | 10 | nil |
| Total Press—p. s. i. g | 49 | 49 | 49 | 49 | 30 | 90 | 110 | 65 | 50 | 25 | 15 |
| Leaching Time—Hours | 14 | 10 | 14 | 14 | 7 | 5 | 2 | 5 | 10 | 8 | 6 |

TABLE III

| Final Solution: | | | | | | | | | | | |
|---|---|---|---|---|---|---|---|---|---|---|---|
| pH | 1.04 | 1.0 | 1.2 | 1.2 | 2.5 | 1.2 | 1.05 | 1.3 | 1.3 | 1.3 | 6.4 |
| $U_3O_8$—gm./l | 0.38 | 0.83 | 0.41 | 0.85 | 2.1 | 2.1 | 1.8 | 1.6 | 1.6 | 1.6 | trace |
| $SO_4$—gm./l | 35.6 | 61.1 | 24.0 | 34.2 | 6.8 | 12.0 | 73.9 | 14.4 | 20.8 | 19.5 | trace |
| Fe—gm./l | 6.2 | 7.6 | 2.4 | 1.3 | 0.8 | 2.0 | 12.8 | 2.4 | 5.6 | 3.6 | trace |
| $Al_2O_3$—gm./l | n. d. | n. d. | 1.9 | 3.6 | n. d. | n. d. | n. d. | n. d. | n. d. | 5.7 | n. d. |
| Mg—gm./l | n. d. | n. d. | n. d. | 5.1 | n. d. | n. d. | nil | nil | nil | nil | nil |
| Percent $U_3O_8$ extracted | 88.0 | 95.5 | 90.7 | 91.7 | 85.2 | 99.2 | 97.5 | 93.2 | 90.7 | 94.4 | trace |

A¹ and B¹ illustrate the improved results obtained when using re-cycled leach liquor from a previous operation under the same conditions. The starting solution used in the other examples was water. The right column, Table III illustrates the absence of oxidation of sulphur and dissolution of uranium values when no partial pressure of oxygen was employed.

The following Tables IV, V, VI, VII, illustrate the effect of the factors temperature, oxygen partial pressure, composition of leach solution, and recycling the leach solution on the leaching rate and on the extraction of uranium from the starting material. The analysis of the uranium ore treated was:

| | Percent |
|---|---|
| $U_3O_8$ | 0.17 |
| CaO | 0.12 |
| $SiO_2$ | 89.0 |
| Fe | 3.8 |
| MgO | Trace |
| S | 4.4 |
| $Al_2O_3$ | 1.3 |

The major portion of the iron and sulphur were present in the ore as pyrite, $FeS_2$. The uranium was present mainly as finely disseminated uraninite or pitchblende. The charge to the reaction vessel was a slurry comprised of about 50% by weight, solids of less than 100 mesh and about 50%, by weight, water.

TABLE IV

*Effect of temperature on the leaching rate*

| $O_2$ Pressure, p.s.i. | Temp., °C. | $U_3O_8$ Extracted—Percent | | | | | | Final pH | Final Fe, gm./l. |
|---|---|---|---|---|---|---|---|---|---|
| | | 1 hour | 2 hours | 4 hours | 6 hours | 8 hours | 10 hours | | |
| 10 | 110 | | | 65 | 72 | 80 | 84 | 1.6 | 1.4 |
| | 120 | | 70 | 81 | 89 | 92 | | 1.0 | 2.8 |
| | 130 | | 76 | 91 | 95 | 95 | | 0.9 | 4.8 |
| | 140 | 66 | 79 | 93 | | | | 0.8 | 3.8 |
| | 150 | 75 | 89 | 95 | | | | 0.6 | 5.3 |
| 20 | 100 | | 54 | 55 | | 74 | | 2.7 | 0.4 |
| | 110 | | 68 | 76 | 88 | | | 1.7 | 0.9 |
| | 120 | | | 91 | | | | 1.4 | 2.7 |
| | 150 | | 87 | 94 | | | | 1.2 | 3.6 |

TABLE V

*Effect of oxygen pressure on the leaching rate*

| Temp., °C. | $O_2$ Pressure, p.s.i. | $U_3O_8$ extracted—Percent | | | | | | Final pH | Final Fe, gm./l. |
|---|---|---|---|---|---|---|---|---|---|
| | | 1 hour | 2 hours | 4 hours | 6 hours | 8 hours | 10 hours | | |
| 110 | 10 | | | 65 | 72 | 80 | 84 | 1.6 | 0.9 |
| | 20 | | 68 | 76 | 88 | | | 1.7 | 0.9 |
| | 40 | | 75 | 78 | | | | 1.8 | 1.0 |
| 120 | 0 | | tr. | tr. | tr. | | | 6.4 | tr. |
| | 10 | | 70 | 81 | 89 | 92 | | 1.0 | 2.8 |
| | 20 | | 85 | 93 | 95 | | | 1.0 | 3.4 |
| 150 | 5 | 66 | 79 | 93 | | | | 0.9 | 3.8 |
| | 10 | 75 | 89 | 95 | | | | 0.6 | 5.3 |

TABLE VI

*Approximate composition of the leach solutions at different uranium extractions*

| $U_3O_8$ Extraction, Percent | pH | Solution Composition | | | | |
|---|---|---|---|---|---|---|
| | | $U_3O_8$, gm./l. | Fe, gm./l. | Al, gm./l. | $SO_4$, gm./l. | Fe/$U_3O_8$ |
| 60 | 2.5 | 1.0 | 0.4 | | | 0.4 |
| 70 | 2.1 | 1.2 | 0.6 | | 5 | 0.5 |
| 80 | 1.7 | 1.4 | 1.0 | | 6 | 0.7 |
| 85 | 1.4 | 1.5 | 1.8 | | 8 | 1.2 |
| 90 | 1.1 | 1.6 | 3.0 | 2.0 | 20 | 1.9 |
| 95 | 0.9 | 1.7 | 5.0 | 2.0 | 25 | 3.0 |

TABLE VII

*Effect of recycling the leach solution*

| Cycle No. | Time required for 95 Percent $U_3O_8$ Extraction, hours | pH | Final Solution | | | |
|---|---|---|---|---|---|---|
| | | | $U_3O_8$, gm./l. | Fe, gm./l. | Al, gm./l. | Fe/$U_3O_8$ |
| 1 | 4 | 0.7 | 1.9 | 5.3 | 2.0 | 2.8 |
| 2 | 3 | 0.6 | 3.8 | 8.5 | 2.8 | 2.2 |

The following example illustrates the operation of the method. 2000 grams of an ore containing 0.16% $U_3O_8$, 4.5% S, 3.8% Fe, 89.6% $SiO_2$ was ground to about 75% minus 200 mesh and mixed with 2000 grams of water. The pulp mixture was charged into an autoclave wherein it was agitated, heated to about 125° C. and maintained under a partial pressure of gaseous molecular oxygen of about 30 pounds per square inch. The total pressure in the autoclave, including the vapour pressure of the solution, was 45 pounds gauge pressure per square inch. At the end of 10 hours, it was found by analysis that 90% of the original uranium values had been extracted from the ore and the pulp mixture was removed from the autoclave and filtered. The undissolved residue was washed and discarded. The solution containing the dissolved uranium values contained 1.5 grams per litre $U_3O_8$, 2.7 grams per litre Fe, 16.2 grams per litre $SO_4$, 3.8 grams per litre $Al_2O_3$, a trace of magnesium and a trace of silica. The final pH value of the solution was 1.4. 10 grams of $NH_3$, equivalent to about 10 pounds per ton of ore, was added to the solution to raise the pH to 8.0. All the uranium precipitated as ammonium diuranate with some iron and aluminum hydroxides. The precipitate was separated from the solution by filtration and ignited after which it contained 14% $U_3O_8$, the remainder being largely $Fe_2O_3$ and $Al_2O_3$. The residual solution contained only traces of uranium and was discarded.

The method as described hereinabove can be employed to extract uranium from oxidized uranium minerals. It is particularly applicable to ores which already contain in their natural state sulphide minerals such as pyrite, pyrrhotite, chalcopyrite and like mineral sulphides. When the ore to be leached does not contain sufficient sulphidic compounds, a small amount of such a compound, either naturally occurring or artificially produced, such as sodium sulphide, hydrogen sulphide, iron sulphide, can be added and the mixture leached as described hereinabove. Alternatively, if it is found to be more convenient, finely divided elemental sulphur particles can be added as it also is oxidized and generates sulphuric acid under the prescribed reaction conditions. If the sulphur compound tends to oxidize slowly, or if the ore contains alkaline constituents such as $CaCO_3$, CaO, MgO, $Al_2O_3$ and the like which are acid consuming and tend to neutralize the acid, larger amounts of sulphide sulphur or elemental sulphur can be added to ensure that acid is generated in amount sufficient to maintain the pH value of the solution within the desired range. There is no upper limit to the amount of sulphidic material which may be present, since the amount which is oxidized and dissolved can be controlled and maintained at a relatively low value by adjusting the temperature, oxygen partial pressure and leaching time.

Only water is required to effect extraction of uranium values by this method. However, the solution employed may contain initially some acid or other salts. While these are not required, they are in no way detrimental to the conduct of the reaction. If desired, leach solution from a previous leaching operation can be recycled to leach another batch of ore and in this way the concentration of uranium can be increased to any desired value before it is precipitated. It is found in recycling the leach solution that less iron and other contaminating mineral sulphates are dissolved in the second cycle and a higher ratio of uranium to impurities is obtained in the solution. This modification is adapted for operation of the leaching stage on a continuous scale with the addition of uranium bearing material, water and recycled solution to and withdrawal of pulp mixture from the leaching stage, return of a portion of the leach solution to the leaching stage, and treatment of a portion of the pregnant leach solution for separation and recovery of uranium values.

In addition to uranium, some iron, aluminum, and magnesium, if present in the starting material, may dissolve in the solution as sulphate salts. The amount of these salts which dissolve can be kept to a minimum if the leach is conducted at a temperature within the range of from about 100° C. to about 150° C.

Uranium values can be precipitated from the solution by any one of several known methods. A particularly convenient method of separating dissolved uranium values from the pregnant leach solution consists in raising the pH value of the solution by addition of ammonia to about pH 6 or higher. This causes precipitation of substantially all the dissolved uranium values as an ammonium uranate salt along with hydroxides of iron, aluminum and magnesium present in the solution.

As the leaching method permits the concentrations of free acid and of iron salt in the solution to be maintained at a low level, only a small amount of ammonia is required for the precipitation and a uranium product of satisfactory grade is obtained. If desired, the uranium content of the precipitate can be increased by igniting it or by leaching it with a carbonate solution which dissolves the uranium and separates it from the iron, aluminum and magnesium hydroxides. A pure uranium product can be recovered readily from the carbonate solution. The barren liquor from the ammonia precipitation step contains ammonium sulphate and can be discarded, recycled or evaporated to recover the ammonium sulphate.

The method of the present invention possesses a number of important advantages. The acid concentration of the solution is low and the method can be operated at reasonably low temperatures and pressures, thus permitting the use of relatively inexpensive, available equipment. The only reagents necessary for the extraction of uranium values are mineral sulphides which usually are associated with the ore, water which is usually readily available and air. The reactions in which the sulphur is oxidized to sulphuric acid and the uranium values are extracted from the ore and dissolved in the leach solution proceed rapidly.

It will be understood, of course, that modifications can be made in the preferred embodiments of the invention described herein without departing from the scope of the invention defined by the appended claims.

What we claim as new and desire to protect by Letters Patent of the United States is:

1. The method of extracting uranium values from uranium bearing starting material which comprises the steps of forming a slurry of finely divided uranium bearing material, at least one of the group consisting of mineral sulphides and elemental sulphur, and an aqueous solution, heating the pulp mixture to a temperature above about 80° C. in a reaction vessel, feeding an oxygen bearing, oxidizing gas into the reaction vessel in amount sufficient to maintain a positive partial pressure of oxygen above the pressure autogenously generated by the temperature at which the reaction is conducted, continuing the oxidation reaction to dissolve uranium values in the leach solution, and separating leach solution containing dissolved uranium values from the undissolved residue.

2. The method of extracting uranium values from uranium bearing starting material according to claim 1 in which the aqueous solution is of the group consisting of water and an aqueous acid sulphate solution.

3. The method of extracting uranium values from uranium bearing starting material according to claim 1 in which the mineral sulphides are associated in nature with the uranium bearing starting material.

4. The method of extracting uranium values from uranium bearing starting material according to claim 1 in which at least one of the group consisting of mineral sulphides and elemental sulphur is added to the uranium bearing material charged to the reaction vessel in amount sufficient to produce a solution having a pH value lower than about pH 3.

5. The method of extracting uranium values from uranium bearing starting material according to claim 1 in which the temperature of the reaction is maintained between 80° C. and 200° C.

6. The method of extracting uranium values from uranium bearing starting material which comprises the steps of forming a slurry of finely divided uranium bearing material, at least one of the group consisting of mineral sulphides and elemental sulphur, and an aqueous solution, heating the pulp mixture to a temperature above about 80° C. in a reaction vessel, feeding an oxygen bearing, oxidizing gas into the reaction vessel in amount sufficient to maintain a positive partial pressure of oxygen above the pressure autogenously generated by the temperature at which the reaction is conducted, continuing the oxidation reaction to dissolve uranium values in the leach solution, separating leach solution containing dissolved uranium values from undissolved residue, adding ammonia to the solution to convert dissolved uranium values to and precipitate them as an ammonium uranate, and recovering precipitated ammonium uranate from the solution.

7. The method of extracting uranium values from uranium bearing starting material which comprises the steps of forming a slurry of finely divided uranium bearing material, at least one of the group consisting of mineral sulphides and elemental sulphur, and an aqueous solution of the group consisting of water and an aqueous acid sulphate solution, heating the slurry to a temperature above about 80° C. in a reaction vessel, feeding an oxygen bearing, oxidizing gas into the reaction vessel in amount sufficient to maintain a positive partial pressure of oxygen above the pressure autogenously generated by the temperature at which the reaction is conducted, the member of the group consisting of mineral sulphides and sulphur being present in the reaction mixture in amount sufficient to produce during the oxidation reaction a solution having a pH value within the range of from about pH 1 to about pH 3, continuing the oxidation reaction to dissolve uranium values in the leach solution, and separating leach solution containing dissolved uranium values from the undissolved residue.

8. The method of extracting uranium values from uranium bearing starting material which comprises the steps of forming a slurry of finely divided uranium bearing material, at least one of the group consisting of mineral sulphides and elemental sulphur and an aqueous acid sulphate solution containing dissolved uranium values, heating the slurry to a temperature above about 80° C. in a closed reaction vessel, feeding an oxygen bearing, oxidizing gas into the reaction vessel in amount sufficient to maintain a positive partial pressure of oxygen above the pressure autogenously generated by the temperature at which the reaction is conducted, continuing the oxidation reaction to dissolve uranium values in the leach solution, separating leach solution containing dissolved uranium values from the undissolved residue, and returning solution containing dissolved uranium values to the leaching step of the method.

9. The method of extracting uranium values from uranium bearing starting material which comprises the steps of forming a slurry of finely divided uranium bearing material, at least one of the group consisting of mineral sulphides and elemental sulphur, and an aqueous solution of the group consisting of water and an aqueous acid sulphate solution, heating the slurry to and maintaining it at a temperature within the range of from about 80° C. to about 200° C. in a closed reaction vessel, feeding an oxygen bearing, oxidizing gas into the reaction vessel in amount sufficient to maintain a positive partial pressure of oxygen above the pressure autogenously generated by the temperature at which the reaction is conducted, continuing the oxidation reaction to dissolve uranium values in the leach solution, and separating leach solution containing dissolved uranium values from the undissolved residue.

References Cited in the file of this patent

Lennemann: Engineering and Mining Journal, vol. 155, No. 9, page 104 (Sept. 1954).